NESBITT, Jr., & COSLEY.
Hominy Machine.
No. 13,549. Patented Sept. 11, 1855.
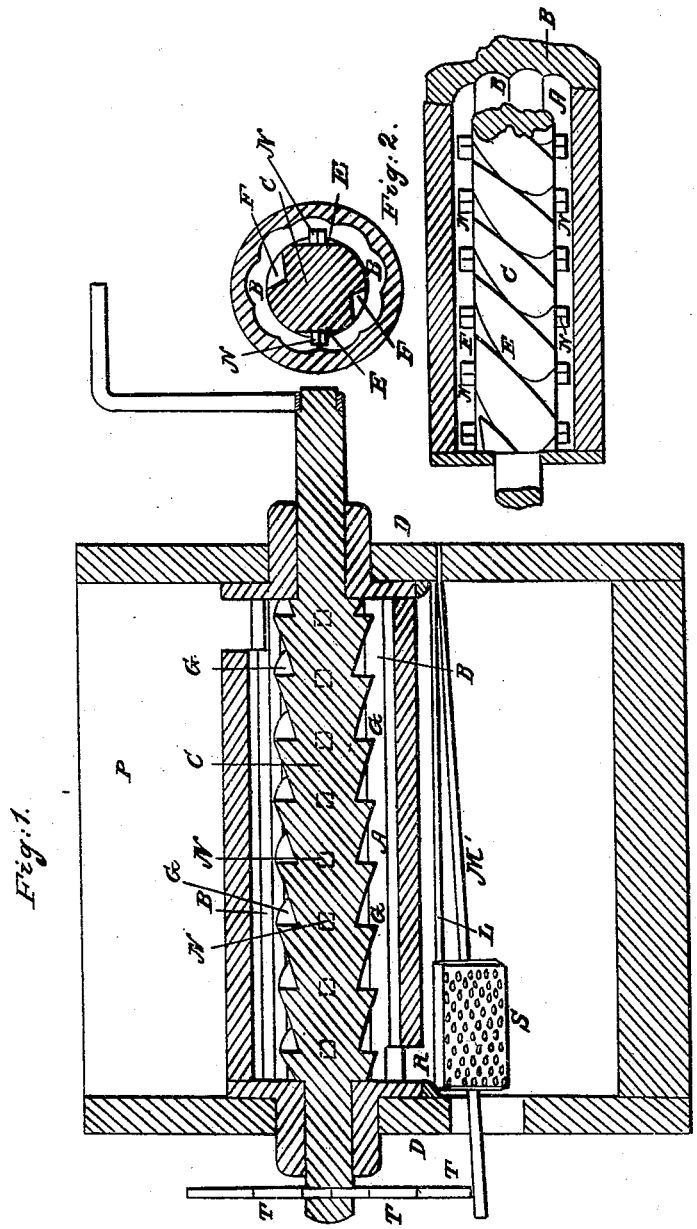

UNITED STATES PATENT OFFICE.

JON. NESBITT, JR., AND THOS. J. COSLEY, OF CLEAR SPRING, MARYLAND.

HOMINY-MACHINE.

Specification of Letters Patent No. 13,549, dated September 11, 1855.

*To all whom it may concern:*

Be it known that we, JONATHAN NESBITT, Jr., and THOMAS J. COSLEY, of Clear Spring, in the county of Washington and State of Maryland, have invented an Improvement in Hominy-Machines, and the following is a full, clear, and exact description of the principle or character which distinguishes it from all other things before known and of the usual manner of making, modifying, and using the same, reference being had to the annexed drawings, of which—

Figure 1 represents a vertical section through our machine; Fig. 2, a detached view of the beater.

The nature of our improvement in hominy machines is such that the operations of hulling and breaking the corn is not only greatly facilitated but the machine can be made at a very cheap rate, for the reason that our beater or cylinder as it is sometimes called can be made of cast iron and easily cast at one operation. The concave A, is armed with ribs or projections B, B, throughout its length. The revolving "cylinder" or beater C, mounted on suitable bearings D, D, extends through the concave and presents four faces E, E and F, F. The faces E, E, are flat and opposite to each other. The faces F, F, are with inclined or screw like projections G, G, so arranged that if continued across the faces E, E, these projections would meet, and by the action of their inclined sides and edges propel the corn through the concave and beat and break it rapidly and effectually. The spurs or teeth N, N, are inserted in the plane faces E, E, and may be cast with, or afterward inserted in the beater, and have their outer extremities projecting so as to pass very near to the concave. Their function is to stir and clean the corn and prevent the machine from clogging or "gumming" as it is called. These spurs may vary in shape but the square form is preferable. The corn is introduced at the hopper P and is propelled throughout the concave and delivered at the opening R, falling upon the screen S which is kept in agitation by the striking of the revolving spurs T T upon the spring bar M. The screen is hinged upon the bar L and rests upon the spring bar M.

It is obvious that some parts of the machine may be changed without altering the action of our peculiar form of beater, which though it possesses to a sufficient degree the propelling action of a screw, yet is so made as to be cast whole with facility, and has a decided advantage over a screw with an entire thread.

We have found that a screw with an entire thread propels mostly and does not crush, while the terminations of the broken or quarter threads in our machine breaks the corn in a most perfect manner. Some hominy beaters have been made with a screw thread entire and the difficulty of casting such a form has led to the use of wrought iron for such beaters, thereby adding greatly to the expense. The same is true also of twisted beaters made of wrought iron, and by the peculiar form of our beater—in which all the real advantage of the screw is fully retained—we are enabled to cast it whole and at one operation and thus afford a cheaper machine than any within our knowledge and thus far we believe unrivaled for efficiency.

What we claim therefore is—

1. The construction of the beater as herein set forth the same consisting in a beater provided with four faces, two of which are plane or squared, and two provided with the inclined or screw like projections in the manner and for the purposes described.

2. We claim in combination with such beater the two rows of spurs inserted in its plane faces as set forth.

JONATHAN NESBITT, JR.
THOMAS J. COSLEY.

Witnesses:
AMOS ADAMS,
JAMES H. KERR.